(12) United States Patent
Arayama et al.

(10) Patent No.: US 11,799,566 B2
(45) Date of Patent: Oct. 24, 2023

(54) MOBILE TERMINAL TEST DEVICE AND BAND FILTER SETTING METHOD THEREOF

(71) Applicant: ANRITSU CORPORATION, Kanagawa (JP)

(72) Inventors: Masahiro Arayama, Kanagawa (JP); Atsuki Morita, Kanagawa (JP); Nobuaki Shimakawa, Kanagawa (JP); Daiki Kano, Kanagawa (JP); Daisuke Nakagawa, Kanagawa (JP); Takumi Nakamura, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 18/047,809

(22) Filed: Oct. 19, 2022

(65) Prior Publication Data

US 2023/0155700 A1 May 18, 2023

(30) Foreign Application Priority Data

Nov. 16, 2021 (JP) ................................ 2021-186409

(51) Int. Cl.
*H04B 17/29* (2015.01)
*H04B 17/15* (2015.01)

(52) U.S. Cl.
CPC ............. *H04B 17/29* (2015.01); *H04B 17/15* (2015.01)

(58) Field of Classification Search
CPC ...................................................... H04B 17/29
See application file for complete search history.

(56) References Cited

U.S. PATENT DOCUMENTS

| | | | |
|---|---|---|---|
| 2008/0002584 A1* | 1/2008 | Leng ....................... | H04W 8/04 370/235 |
| 2021/0243621 A1 | 8/2021 | Kano et al. | |

FOREIGN PATENT DOCUMENTS

JP    2021-121085 A    8/2021

* cited by examiner

*Primary Examiner* — Hsinchun Liao
(74) *Attorney, Agent, or Firm* — Pearne & Gordon LLP

(57) ABSTRACT

To provide a mobile terminal test device capable of performing a test with high efficiency by automatically setting a Band filter. A mobile terminal test device includes a simulated base station unit 2 that performs 5G NR communication with a mobile terminal 10 in accordance with the 5G NR standard, a scenario processing unit 3 that reads a stored scenario and causes the simulated base station unit 2 to transmit notification information or execute a communication sequence with the mobile terminal 10, based on the scenario, and a control unit 6 that, when being connected to the mobile terminal 10, sets, as a Band filter, a band set as a communicable frequency band and transmits the set band to the mobile terminal 10.

3 Claims, 2 Drawing Sheets

MOBILE TERMINAL TEST DEVICE AND BAND FILTER SETTING METHOD THEREOF

TECHNICAL FIELD

The present invention relates to a mobile terminal test device that tests a mobile terminal.

BACKGROUND ART

When a mobile terminal such as a portable phone or a data communication terminal that performs communication while moving has been developed, it is necessary to test whether or not the developed mobile terminal can perform communication normally. Therefore, a test in which a mobile terminal under test is connected to a test device that operates as a simulated base station that simulates the functions of an actual base station, communication is performed between the test device and the mobile terminal, and the content of the communication is checked is performed.

In addition, in a mobile communication system, a service of 5th Generation (5G) New Radio (NR), which is a 5G radio scheme, has started.

In 5G NR, specifications of non-standalone (NSA) in which transmission and reception are performed by a 5G line specialized in a user plane (U-Plane: user data signal), and a control plane (C-Plane: communication control signal) using a long term evolution (LTE) line and stand alone (SA) in which an operation is performed independently of 5G NR without cooperation with LTE are defined.

Patent Document 1 discloses a mobile terminal test system that performs an NSA test by using a mobile terminal test device that operates as an LTE base station and a mobile terminal test device that operates as an NR base station.

RELATED ART DOCUMENT

Patent Document

[Patent Document 1] JP-A-2021-121085

DISCLOSURE OF THE INVENTION

Problem that the Invention is to Solve

In 5G NR, the number of supported frequency bands has increased compared to LTE. When connection is set to be possible in all frequency bands, it is expected that processing of a mobile terminal is delayed. Thus, when a base station and a mobile terminal are connected to each other, "Band filter" for causing the base station to inform the mobile terminal of a connectable frequency band can be set, and thus the connectable frequency band can be limited.

As described above, by applying a Band filter, the frequency band to which the mobile terminal can be connected is limited, and processing in unnecessary frequency bands is reduced, and thus the processing speed of the mobile terminal is increased.

However, in the mobile terminal test device, the Band filter is set for every connection with the mobile terminal. Thus, there is a concern that it is not possible to efficiently proceed a test.

An object of the present invention is to provide a mobile terminal test device capable of performing a test with high efficiency by automatically setting a Band filter.

Means for Solving the Problem

According to the present invention, a mobile terminal test device tests a mobile terminal by simulating a 5G NR base station. The mobile terminal test device includes a control unit that, when being connected to the mobile terminal, sets a communicable frequency band as a Band filter and transmits the set communicable frequency band to the mobile terminal.

With this configuration, when being connected to the mobile terminal, a band set as the communicable frequency band is set as the Band filter and transmitted to the mobile terminal. Therefore, there is no need to set the Band filter for every connection with the mobile terminal, and it is possible to perform a test with high efficiency.

In the mobile terminal test device according to the present invention, when an automatic setting mode is set as a setting mode of the Band filter, the control unit sets a band set in Operation Band as the Band filter, and transmits the set band to the mobile terminal.

In the mobile terminal test device according to the present invention, when a manual setting mode is set as a setting mode of the Band filter, the control unit causes a user to set a band set as the Band filter when being connected to the mobile terminal.

With this configuration, when the manual setting mode is set as the setting mode of the Band filter, and the mobile terminal test device is connected to the mobile terminal, the band set as the Band filter is set by the user. Therefore, it is possible to set the band desired to be set by the user, as the Band filter, and to flexibly respond to the test.

In the mobile terminal test device according to the present invention, when a manual setting mode is set as a setting mode of the Band filter, the control unit causes a user to select a band set as the Band filter from a band set as the communicable frequency band when being connected to the mobile terminal.

With this configuration, when the manual setting mode is set as the setting mode of the Band filter, the user is caused to select the band set as the Band filter from the bands set as the communicable frequency band when being connected to the mobile terminal. Therefore, it is possible to set, as the Band filter, the band desired to be set by the user from the available band, and it is possible to perform a test with high efficiency while flexibly responding to the test.

Further, according to the present invention, there is provided a Band filter setting method of a mobile terminal test device that tests a mobile terminal by simulating a 5G NR base station. The Band filter setting method includes a step of setting a communicable frequency band and a step of, when being connected to the mobile terminal, setting the communicable frequency band as a Band filter and transmitting the communicable frequency band to the mobile terminal.

With this configuration, when being connected to the mobile terminal, a band set as the communicable frequency band is set as the Band filter and transmitted to the mobile terminal. Therefore, there is no need to set the Band filter for every connection with the mobile terminal, and it is possible to perform a test with high efficiency.

Advantage of the Invention

According to the present invention, it is possible to provide a mobile terminal test device capable of performing a test with high efficiency by automatically setting a Band filter.

BEST MODE FOR CARRYING OUT THE INVENTION

Hereinafter, a mobile terminal test device according to an embodiment of the present invention will be described in detail with reference to the drawings.

Figure 1:
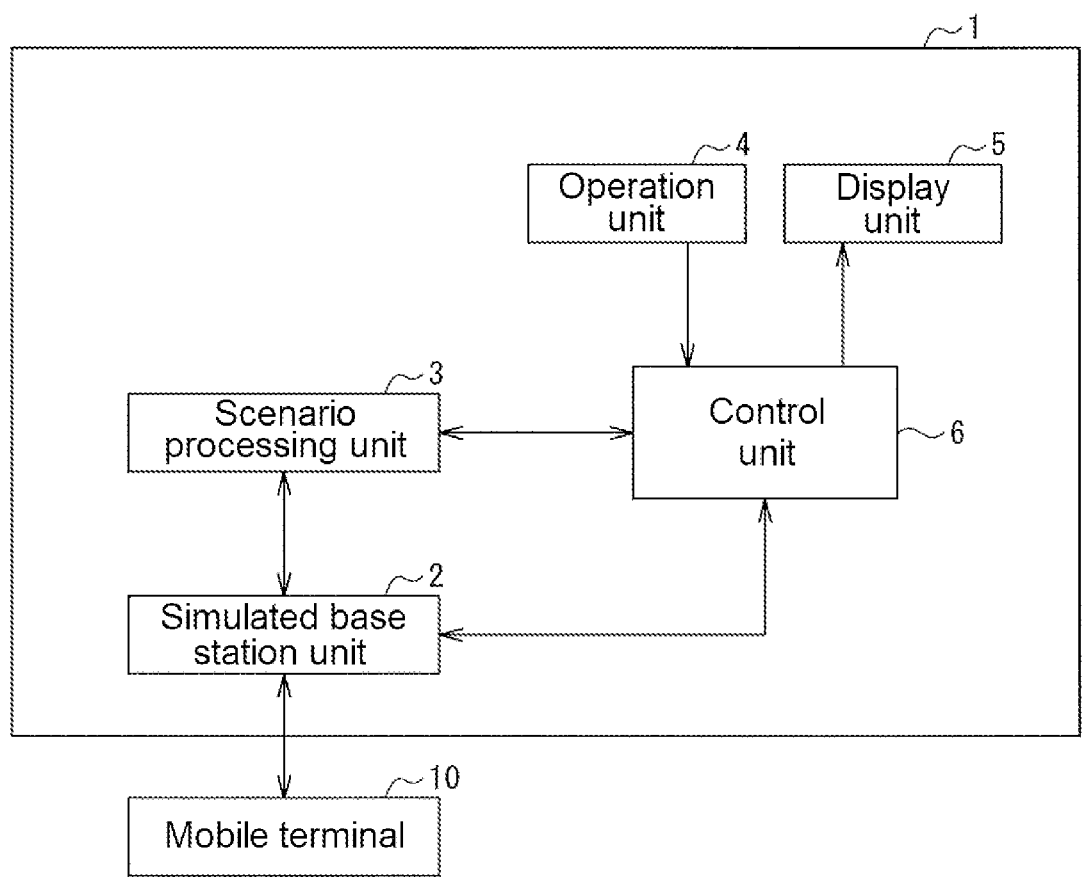
FIG. 1 is a block diagram illustrating main units of a mobile terminal test device according to an embodiment of the present invention.

In FIG. 1, a mobile terminal test device 1 according to an embodiment of the present invention acts as a simulated base station to transmit and receive an RF (radio frequency) signal to and from a mobile terminal 10 via a coaxial cable or the like in a wired manner. The mobile terminal test device 1 may wirelessly transmit and receive an RF signal to and from the mobile terminal 10 via an antenna.

The mobile terminal test device 1 is configured to include a simulated base station unit 2, a scenario processing unit 3, an operation unit 4, a display unit 5, and a control unit 6.

The simulated base station unit 2 transmits and receives an RF signal to and from the mobile terminal 10 under the control of the scenario processing unit 3. The simulated base station unit 2 outputs the state of the communication with the mobile terminal 10 and the like to the control unit 6.

The simulated base station unit 2 can perform 5G NR communication with the mobile terminal 10 in accordance with the 5G NR standard.

In response to an instruction from the control unit 6, the scenario processing unit 3 reads out a stored scenario and causes the simulated base station unit 2 to transmit notification information or execute a communication sequence with the mobile terminal 10, based on the scenario.

The operation unit 4 is configured by an input device such as a keyboard, a mouse, and a touch panel, and outputs information and the like that are input by an operation and are required for generating the scenario, to the control unit 6. The display unit 5 is configured by an image display device such as a liquid crystal display, and displays an image for inputting information required for generating a scenario, an image indicating a state during a test, and the like.

In accordance with an instruction input to the operation unit 4, the control unit 6 causes the display unit 5 to display a test scenario creation screen to input information required for generating the test scenario, or to generate the test scenario based on the information input to the operation unit 4 on the test scenario creation screen. In addition, in accordance with an instruction input to the operation unit 4, the control unit 6 transmits the instruction to the scenario processing unit 3 to perform a test based on a test scenario stored in a storage device or to display the state or the like during the test on the display unit 5 based on information on the state of each layer and the state of communication with the mobile terminal 10, which are transmitted from the scenario processing unit 3, and the like.

Here, the mobile terminal test device 1 is configured by a computer device (not illustrated) provided with a communication module for communicating with the mobile terminal 10. The computer device includes a central processing unit (CPU), a read only memory (ROM), a random access memory (RAM), a storage device such as a hard disk device, an input and output port, and a touch panel (not illustrated).

A program for causing the computer device to function as the mobile terminal test device 1 is stored in the ROM and the hard disk device of the computer device. That is, the computer device functions as the mobile terminal test device 1 by the CPU executing the program stored in the ROM by using the RAM as a work area.

As described above, in the present embodiment, the scenario processing unit 3 and the control unit 6 are configured by the CPU, and the simulated base station unit 2 is configured by the communication module.

In the mobile terminal test device 1 having such a configuration, when testing the mobile terminal 10 compatible with 5G NR, the control unit 6 causes the user to set a parameter as the simulated 5G NR base station, a test signal sequence, and the like. Then, the control unit 6 creates a test scenario and stores the test scenario in the storage device.

The control unit 6 sets, for example, a band as a communicable frequency band in the simulated base station unit 2, as "Operation Band" in parameters of the simulated base station. The control unit 6 may set a plurality of bands as "Operation Band".

The control unit 6 transmits "Band filter" to the mobile terminal 10 when being connected to the mobile terminal 10 compatible with 5G NR.

The control unit 6 selects either an automatic setting mode or a manual setting mode as a setting mode of the Band filter as the parameter of the simulated base station.

When the automatic setting mode is set, and the mobile terminal test device is connected to the mobile terminal 10, the control unit 6 sets the band set as "Operation Band" to the Band filter to be transmitted to the mobile terminal 10, and then transmits the set band.

When the manual setting mode is set, for example, the control unit 6 causes the display unit 5 to display the band set in "Operation Band", and selects a band to be set as the Band filter from the displayed band. Then, the control unit 6 sets the selected band as the Band filter and transmits the band, and is connected to the mobile terminal 10. When the manual setting mode is set, the control unit 6 may set the band input from the operation unit 4, as the Band filter, and transmit the band to be connected to the mobile terminal 10.

Figure 2:
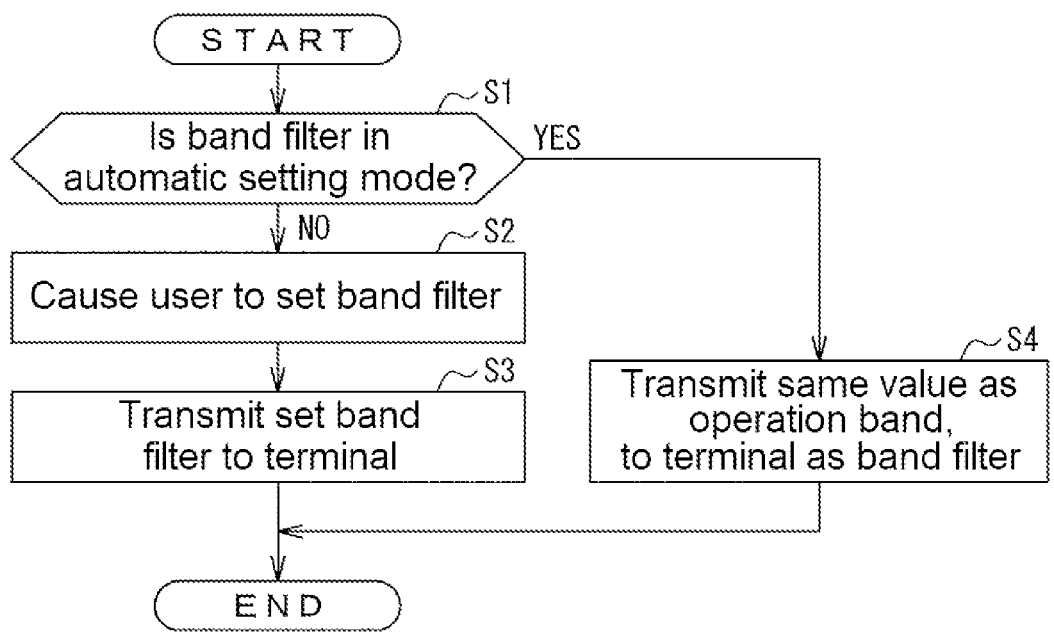
FIG. 2 is a flowchart for explaining a procedure of Band filter transmission processing of the mobile terminal test device according to the embodiment of the present invention.

Band filter transmission processing by the mobile terminal test device according to the present embodiment, which is configured as described above, will be described with reference to FIG. 2. The Band filter transmission processing described below is executed when connection with the mobile terminal 10 compatible with 5G NR is selected.

In Step S1, the control unit 6 determines whether or not the setting mode of the Band filter is the automatic setting mode.

When determining that the setting mode of the Band filter is the automatic setting mode, the control unit 6 executes the process of Step S4. When determining that the setting mode of the Band filter is not the automatic setting mode, the control unit 6 executes the process of Step S2.

In Step S2, the control unit 6 causes the user to set the Band filter. After executing the process of Step S2, the control unit 6 executes the process of Step S3.

In Step S3, the control unit 6 transmits the set Band filter to the mobile terminal 10. After executing the process of Step S3, the control unit 6 ends the Band filter transmission processing.

In Step S4, the control unit 6 sets the band set as Operation Band to the Band filter and transmits the set band to the mobile terminal 10. After executing the process of Step S4, the control unit 6 ends the Band filter transmission processing.

As described above, in the above-described embodiment, when the automatic setting mode is set as the setting mode of the Band filter, and the mobile terminal test device is connected to the mobile terminal 10, the control unit 6 sets the band set as "Operation Band" to the Band filter to be transmitted to the mobile terminal 10, and transmits the set band.

As a result, there is no need to set the Band filter for every connection with the mobile terminal 10, and it is possible to perform a test with high efficiency.

When the manual setting mode is set as the setting mode of the Band filter, the control unit 6 causes the band to be set as the Band filter to be input, sets the input band to the Band filter, and transmits the set band. Then, the control unit 6 is connected to the mobile terminal 10.

This makes it possible to set the band desired to be set by the user, as the Band filter, and to flexibly respond to the test.

Further, when the manual setting mode is set as the setting mode of the Band filter, the control unit 6 displays the band set as "Operation Band", and selects the band to be set as the Band filter from the displayed bands. Then, the control unit 6 set the selected band to the Band filter and transmits the set band.

Thus, it is possible to select and set the band desired to be set by the user from the bands set as "Operation Band", and to set the band desired to be set by the user to be the Band filter from the available bands. Thus, it is possible to perform a test with high efficiency while flexibly responding to the test.

Hitherto, the embodiment of the present invention has been disclosed, but it is clear that changes can be made by those skilled in the art without departing from the scope of the present invention. All such modifications and equivalents are intended to be included in the claims as follows.

DESCRIPTION OF REFERENCE NUMERALS AND SIGNS

1 MOBILE TERMINAL TEST DEVICE
2 SIMULATED BASE STATION UNIT
3 SCENARIO PROCESSING UNIT
4 OPERATION UNIT
5 DISPLAY UNIT
6 CONTROL UNIT
10 MOBILE TERMINAL

What is claimed is:

1. A mobile terminal test device that tests a mobile terminal by simulating a 5G NR base station, the device comprising:
   a control unit configured to set a communicable frequency band as a Band filter and to transmit the communicable frequency band to the mobile terminal, when being connected to the mobile terminal,
   wherein when a manual setting mode is set as a setting mode of the Band filter, the control unit is configured to cause a user to set a band set as the Band filter when being connected to the mobile terminal.

2. The mobile terminal test device according to claim 1, wherein when an automatic setting mode is set as a setting mode of the Band filter, the control unit is configured to set the band set in an Operation Band as the Band filter, and to transmit the band set to the mobile terminal.

3. A mobile terminal test device that tests a mobile terminal by simulating a 5G NR base station, the device comprising:
   a control unit configured to set a communicable frequency band as a Band filter and to transmit the communicable frequency band to the mobile terminal, when being connected to the mobile terminal,
   wherein when a manual setting mode is set as a setting mode of the Band filter, the control unit causes a user to select a band set as the Band filter from bands set as the communicable frequency band when being connected to the mobile terminal.

* * * * *